United States Patent [19]

Dengler

[11] Patent Number: 4,860,459
[45] Date of Patent: Aug. 29, 1989

[54] BUBBLE LEVEL

[75] Inventor: Herbert Dengler, Grosshabersdorf, Fed. Rep. of Germany

[73] Assignee: Bayerische Mass-Industrie Arno Keller GmbH, Hersbruck, Fed. Rep. of Germany

[21] Appl. No.: 164,160

[22] Filed: Mar. 3, 1988

[30] Foreign Application Priority Data

Mar. 7, 1987 [DE] Fed. Rep. of Germany ....... 3707425

[51] Int. Cl.$^4$ .............................................. G01C 9/28
[52] U.S. Cl. .......................................... 33/379; 33/381
[58] Field of Search ........................ 33/377, 379–385, 33/388, 348.2

[56] References Cited

U.S. PATENT DOCUMENTS

| | | | |
|---|---|---|---|
| 764,092 | 7/1904 | Wilcox | 33/383 |
| 895,573 | 8/1908 | Myers | 33/383 |
| 1,205,956 | 11/1916 | Adkins | 33/384 |
| 2,541,880 | 2/1951 | McMillan et al. | 33/388 |
| 2,634,509 | 4/1953 | Roberts | 33/381 |
| 2,825,144 | 3/1958 | Warden et al. | 33/383 |
| 3,225,451 | 12/1965 | Olexson et al. | 33/381 |
| 3,442,024 | 5/1969 | Don | 33/381 |
| 3,842,514 | 10/1974 | Scheyer | 33/379 |

FOREIGN PATENT DOCUMENTS

| | | |
|---|---|---|
| 463803 | 11/1968 | Fed. Rep. of Germany . |
| 8334916 | 3/1984 | Fed. Rep. of Germany . |
| 1296492 | 5/1962 | France .................... 33/379 |

Primary Examiner—William A. Cuchlinski, Jr.
Assistant Examiner—Patrick R. Scanlon
Attorney, Agent, or Firm—Jordan and Hamburg

[57] ABSTRACT

A bubble level with a hollow metal section has a circular window, in which a cylindrical level tube for a vertical level can be inserted with a positive interlock in the axial direction and can be fastened with a material interlock. A level support is inserted into the hollow section in the axial direction. The support has a cylindrical seat aligned with the window, to receive a level holder that bears a level. An interlock device is disposed between the level support and the level holder. By means of this interlock device, the level holder is mounted axially fixed, but rotatable until it is fastened by the material interlock.

14 Claims, 3 Drawing Sheets

BUBBLE LEVEL

The invention concerns a bubble level with a hollow metal section with a circular window, in which a cylindrical level tube for the vertical level can be inserted with a positive interlock in the axial direction and can be fastened with a material interlock.

BACKGROUND OF THE INVENTION

The starting point for this is the bubble level according to the CH-PS 463 803, where the metal section in one case has a cylindrical seat, and in the other case a conical seat for directly receiving the corresponding cylindrical or conical level tube. Before the level is installed in its seat, the jacket surface of the level tube and the inside surface of the seat are smeared with an adhesive. More adhesive is applied to grooves which are disposed partly in the level tube and partly in the window of the hollow metal section. After the level tube has been inserted and adjusted, this adhesive is supposed to bond so as to guarantee a reliable seat. Premature bonding of the adhesive would impair the adjustment here. On the other hand, if the adhesive hardens too slowly, there is a risk of misadjustment in the meantime. The hardening of such adhesives is associated with an unavoidable volume change. This entails a further risk of causing a defective adjustment. Furthermore, the applicant expressly refers to the adhesive in such bubble levels tearing off as a consequence of temperature and/or humidity. From this it follows that the accuracy of such bubble levels is only limited.

Starting from this prior art, a different design of bubble level (Gm 83 34 916) strives for a high degree of measurement accuracy. Here, the section and the level tube have mutually aligned holes, grooves, or webs, which are supposed to fix the level tube in such a fashion that readjustment is obviated. However, practical experience has shown that such a solution is not achievable, since it leaves out of account the manufacturing tolerances of the utilized components. The various possibilities for installing horizontal levels in the hollow section of the bubble level, while perfectly adjusting the level tube in a seat that is situated in a window of the hollow section cannot be so easily transferred to vertical levels, however. The problem of achieving particularly high accuracy with relatively little expenditure, even for the vertical levels, consequently appears unsolved now as before.

SUMMARY OF THE INVENTION

The invention concerns this problem and solves it with a bubble level of the type described in the introduction, in such a fashion that a level support is inserted in the hollow section in the axial direction and has a cylindrical seat that is flush with the window of the hollow section, to receive a level holder which bears the level, and that an interlocking device is disposed between the level support and the level holder, by means of which the level holder is held axially fast, but rotatable up to its material-interlocking fastening. The inventive design of such a bubble level starts from two basic components, namely first of all the level support, which is introduced into the longitudinal direction of a hollow metal section in a manner that is in itself well known, and is there fixed in the desired position. The fixing can be accomplished by a positive interlock of a support, which generally is made of injection molded plastic, in e.g. the inside ribs of the hollow metal section. Additionally, penetrating rivets, pins, or the like can be provided with the hollow section and the level support. These guarantee the perfect seating of the level support with respect to the hollow section and—in contrast to gluing or the like—are not exposed to the risk of aging. No problematical requirements are imposed on the flush arrangement of the seat of this level support with respect to the window of the hollow section, so that the other component, namely the level holder which bears the level, can readily be placed from outside, axially through the window of the hollow section, into its seat in the level support. Now, instead of being immediately glued there, the invention first of all provides an interlock device between the level support and the level holder. This interlock device does indeed fix the level holder in the axial direction, but guarantees its rotatability which is necessary for adjustment. After the adjustment has been accomplished, the level holder can be fixed by a material interlock. This can be done especially advantageously by ultrasonic welding, but also in other ways. The electrodes required for this can readily be introduced in the axial direction into the hollow metal section. Such a fixation becomes effective very quickly, but in any case faster than the bonding of an adhesive or a casting resin. The durability of such a material interlock is considerably greater. The interlock can be destroyed practically only by destroying the level structure.

It lies within the context of this general inventive idea that the interlock device has several cams which extend into the seat and which are disposed in one radial plane. These cams are disposed at one part, namely the level support or the level holder. The other part has axial guide grooves which correspond to these cams. These guide grooves join into a ring groove of this other part, where this ring groove accepts the cams in a press fit. It can be left to the requirements of the individual case, which of the two components is used for the cams and which for the guide grooves. This interlock device first of all fixes the level holder in the axial direction within the level support. In addition, it permits a rotational motion of the level holder with respect to the level support which was first fixed in the hollow section. This is necessary for the perfect adjustment of the level. When the adjustment has been completed by turning the cylindrical level holder about its axis, fixation by a material interlock follows, e.g. by ultrasonic welding.

It has proven especially advantageous to make the arrangement such that at least one of the cams has a larger or smaller radial height than the other cams, and the associated guide groove has a correspondingly greater or lesser radial depth. From this necessarily follows that the level holder can be inserted axially into its seat in the level support only in a specific rotational position. In this fashion, a subsequent rotational motion during the adjustment process can already be prepared for, which significantly facilitates the mounting process.

A further development of the invention provides that the level holder has a press seat that is opened through a window to its circumference, for radially inserting a level tube which bears the level, whose surface lying in the window forms a circular surface with the bottom of the ring groove of the interlock device, and that this surface is contacted by at least one of the cams in the radial direction in its press seat when the level holder is turned.

This embodiment consequently provides for another component, namely a level tube that receives the level, which can be inserted radially into an appropriate press seat within the level holder. This greatly simplifies manufacture and does not represent an additional uncertainty factor inasmuch as the level tube engages one of the cams during the rotary motion of the level holder, which is used to effect the interlock and is then acted upon in the direction of its insertion motion in the press seat. In this way, one can readily induce a reliable and spatially predetermined seat of the level tube within the level holder without special assembly steps being required for this.

When the window is inserted into the hollow metal section, trimming edges generally occur unavoidably. It lies within the framework of the invention for the front walls of the level holder to lie flush with the outside surface of the hollow section. In this way, the trimming edges are covered to such an extent that they no longer make an interfering appearance. On the other hand, additional finishing of the window edges of the metal section is obviated. The invention further provides that a covering which closes the guide grooves is associated with the level holder. In one embodiment, this covering can extend over the outside surface of the metal section. But it is also possible to design the axial length of the level holder shorter, in such a fashion that the covering, after it is inserted, lies flush with the outside surface of the metal section. The covering advantageously has at least two axially directed tabs which engage the corresponding grooves in the level holder.

BRIEF DESCRIPTION OF THE DRAWINGS

Further features, details, and advantages of the invention appear from the following description of a preferred embodiment of the invention.

DESCRIPTION OF THE PREFERRED EMBODIMENTS

Figure 1:
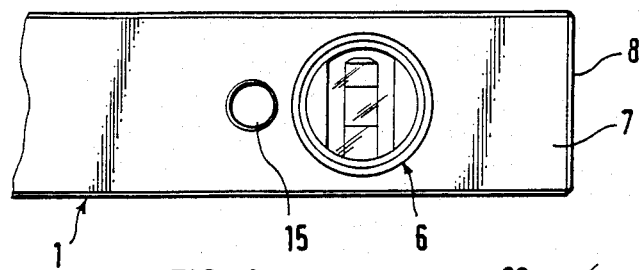
FIG. 1 shows a broken representation of a bubble level with a vertical level.

The bubble level consists of a hollow metal section 1, generally made of light metal. Hollow metal section 1 has a rectangular cross section 2 and has longitudinal ribs 3 disposed on its inside. When a level support 4 is inserted, these ribs cut into axial front walls 5 and thus yield a positive interlock. A vertical level 6 is situated in the region of the end 7 of the hollow section 1, whose end is sealed by a cover 8 which is not shown in more detail. The metal section 1 is penetrated by a window 9 which is used to receive the vertical level 6, as shown in FIG. 1.

Figure 6:
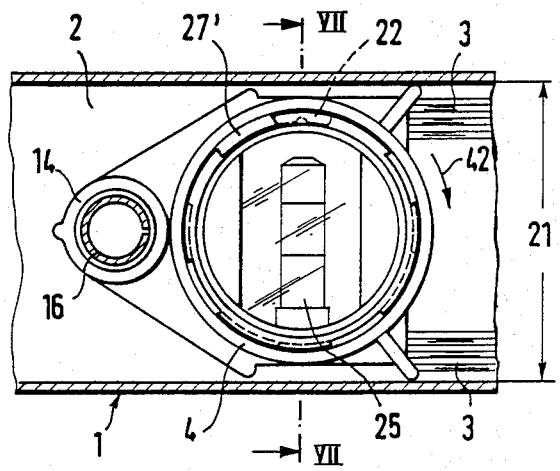
FIG. 6 shows the arrangement according to FIG. 2, in an assembled position.

The arrangement consists first of all of a level support 4, for instance in the form of a cylindrical body 10, which has a cylindrical seat 11, to receive the level holder 12. The annular body 10 has a lateral attachment 13 with a lug 14 built onto it. In the installed state (see especially FIG. 6), this lies aligned with a hold 15 in the metal section 1, and is used to receive a hollow rivet 16 or the like to fix the level support 4 within the hollow section 1. At two mutually opposite sides, the annular body 10 of the level support 4 has cam-shaped attachments 17 and 18, whose imagined connecting lines 19 are parallel to one another. The distance 20 between these connecting lines 19 approximately corresponds to the clear cross-sectional height 21 of the section 1. Four cams 22, disposed approximately at an angle of 90 degrees in a common radial plane, extend into the clear interior space of the seat 11 of this level support 4. However, among these one of the cams 22' has a slightly larger radial height than the other cams 22.

The level 25 is situated in the level holder 12, whose outside surface 26 represents a cylinder, which corresponds to the cylindrical shape of the seat 11 of level support 4. The grooves 27, disposed axis-parallel approximately at an angular spacing of 90 degrees, are situated on the cylinder jacket 26. Their number and arrangement corresponds to that of the cams 22 of the level support 4. As in that case, the cam 22' has a greater height, so the guide groove 27' of the level holder 12 is cut slightly deeper into the cylinder jacket 26. When the level holder 12 is inserted in the axial direction 60 into the press seat 11 of the level support 4, compare especially FIG. 2, this is possible only if the cam 22' of the level support 4 and the guide groove 27' of the level holder 12 coincide with one another. The grooves 27 join into a ring groove 28 in the jacket surface 26, whose clear width 29 corresponds to the axial width 30 of the cams 22. The level holder 12 furthermore has a window 31 that is open towards the cylinder jacket 26. The window 31 has a rectangular cross section. Two parallel guide surfaces 32 connect with it within the level holder 12, and their spacing and area at a distance 33 of the parallel surfaces 34 correspond to those of a level tube 35 that consists of a clear glassy material, where this level tube 35 bears the actual level 25. The width 36 of this surface 34 corresponds to the width 37 of the window 31 of the level holder 12. In this fashion, the level tube 35 finds a perfect press seat within the recess of the level holder 12, a recess which is formed by the window 31 and the two surfaces 32. The opposite top surfaces 38 of the level tube 35 lie flush with the bottom of the ring groove 28 of the level holder 12.

Figure 2:
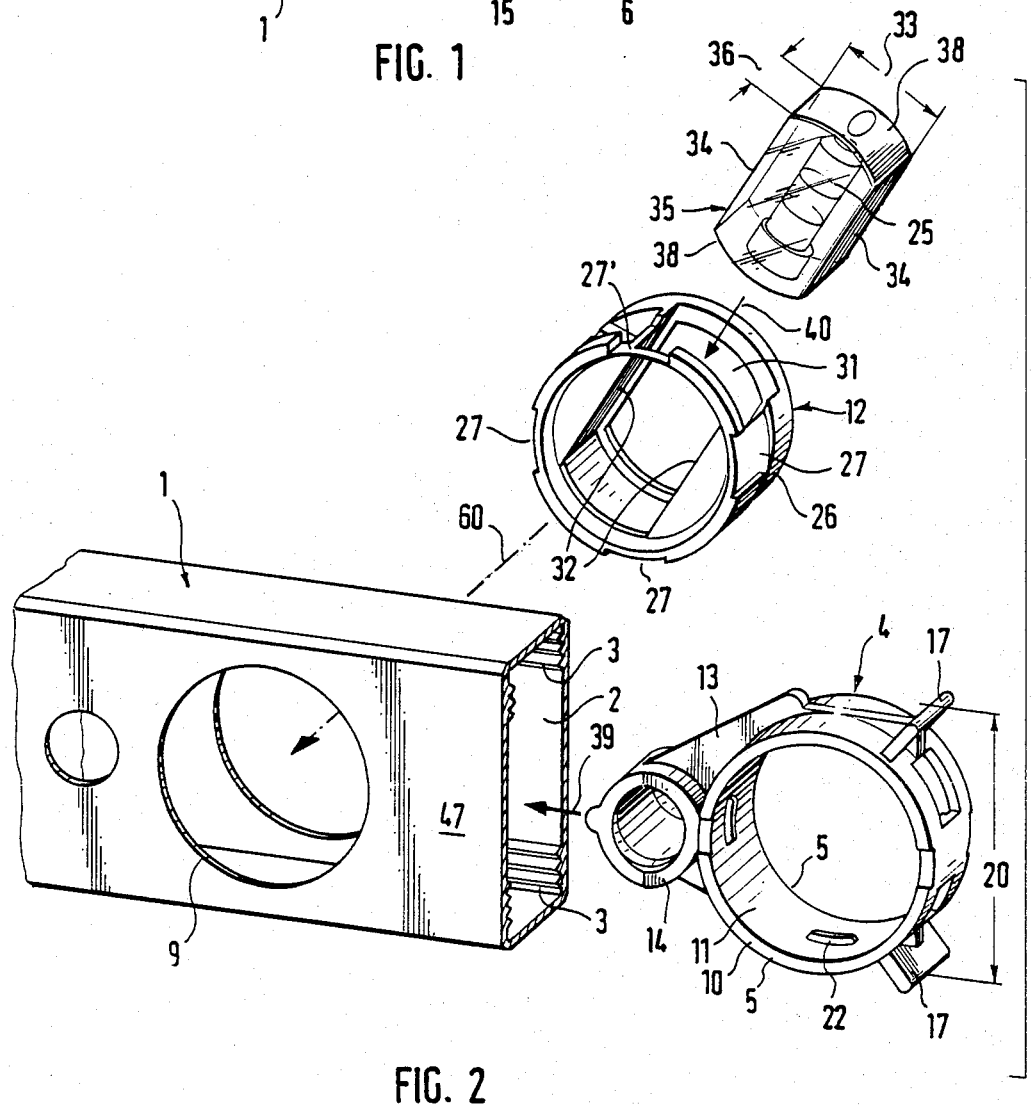
FIG. 2 shows an exploded representation of the inventive device in its totality.
Figure 3:
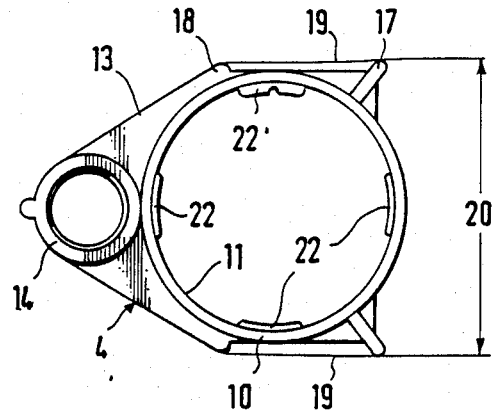
FIG. 3 shows an embodiment of the level support in an axial view.
Figure 4:
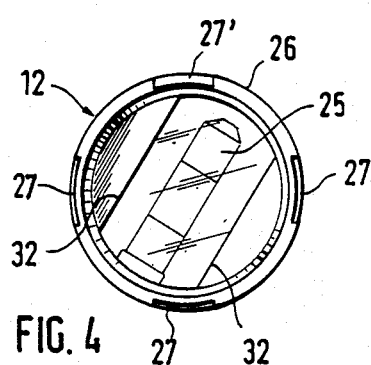
FIG. 4 shows a corresponding view of the level holder.
Figure 5:
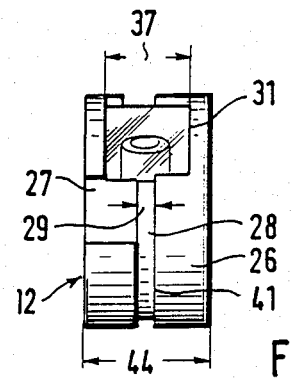
FIG. 5 shows the latter in a side view.

When the device is assembled, the level support 4, in the position shown in FIG. 2, is first introduced into the clear cross section 2 of the hollow section 1, in the direction of the arrow 39, until the seat 11 of the cylindrical body of this level support 4 is aligned with the window opening 9. Here the profiling ribs 3 of the hollow section 1 cut into the walls of the support 4. In addition, the level support 4 is fixed in its position by a groove 16 which is guided by the opening 15 and the lug 13. The level tube 35 on its part is first introduced into the window 31 of the level holder 12 in the direction of the arrow 40, into its seat between the surfaces 32. Then the completed level holder 12 is inserted into the cylindrical press seat 11 of the level support. Here, the inwardly directed cams 22 of the press seat 11 engage their associated guide grooves 27 in the jacket surface 26 of the level holder 12. The axial inserting motion 60 proceeds until the lateral cam surfaces contact the corresponding side wall 41 of the ring groove 28 of the level holder 12. In this position, the level holder 12 can be turned within its seat 11, in the direction of the arrow 42 (see FIG. 6), about its axis, so as to adjust the level 25 with respect to the hollow section 1 of the bubble level. Here, one of the cams 22, in a preferred embodiment the higher cam 22′, runs against the surface 28 of the level tube 35, and acts on it in its insertion direction 40 in the seat between the surfaces 32 of the level holder 12, so that the level tube 35 receives its predetermined position, which is presupposed for adjusting the level 25. After the level 25 has been adjusted, a pair of electrodes is inserted into the end 7 of the hollow metal section 1, in order to weld the level holder 12 ultrasonically to the level support 4, which has already been fixed in the section 1.

Figure 7:
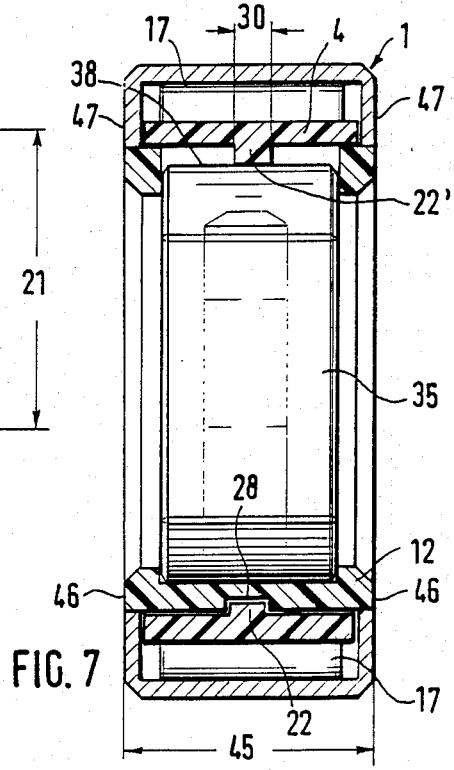
FIG. 7 shows the same in section taken along the line VII—VII in FIG. 6.
Figure 8:
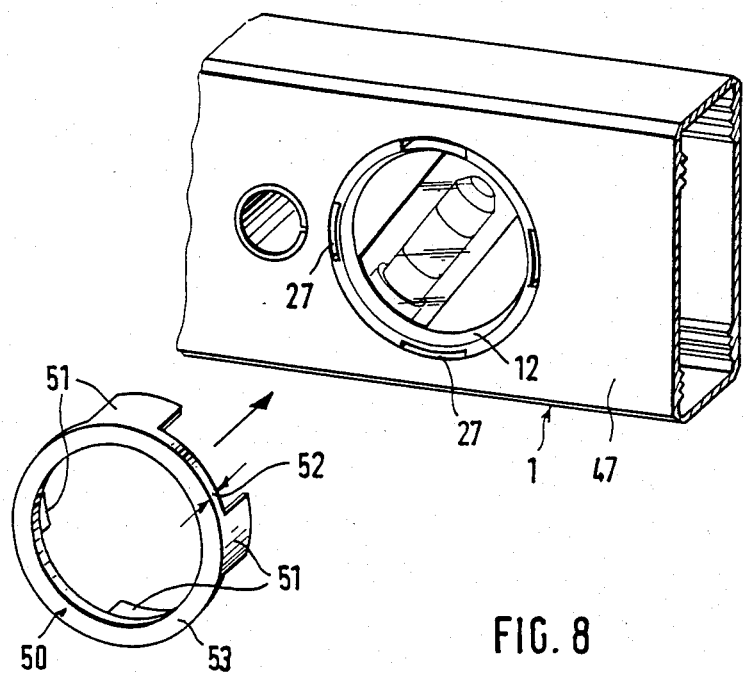
FIG. 8 shows another detail in a perspective representation.

The axial length 44 of the level holder 12 corresponds to the outside dimensions 45 of the narrow side of the hollow section 1, so that the outside edges 46 of the level holder 12 are aligned with the outside surface 47 of the profile 1. When the level holder 12 is inserted in the seat 11 of the level support 4, the grooves 27 of this level holder 12, as FIG. 8 shows, are sealed by means of a covering 50, which has the appropriate tabs 51 for this purpose. The tabs 51 engage the guide grooves 27 of the level holder 12. In the embodiment according to FIG. 7, the covering 50 in this case would extend over the corresponding outside surface 47 of the section 1 by the amount of its wall thickness 52. But it is also conceivable (which, however, is not shown in more detail in the drawing since it is intrinsically understandable) to shorten the axial length 44 of the level holder 12 at the side of the grooves 27 to such an extent that the front surface 53 in the built-in state is flush with the surface 47 of the section 1.

I claim:

1. A bubble level comprising an elongated hollow section having a transversely extending cylindrical window, a level support means disposed in said hollow section and aligned with said window, said level support means having an inner cylindrical seat, a level holder support means supporting a level, mounting means mounting said level holder support means within said cylindrical seat of said level support means, and fastening means fastening said level holder support means in a fixed position on said level support means, said mounting means comprising a plurality of cams disposed in a common plane along one of said support means and a plurality of transverse guide grooves arranged in the other of said support means in complementary relation to said cams, said mounting means further comprising a ring groove in said other support means interconnecting said guide grooves, whereby said level holder support means is adapted to be mounted in said level support means and to be rotated relative to said level support means prior to being fastened to said level support means by said fastening means.

2. A bubble level as in claim 1, wherein said elongated hollow section is metal.

3. A bubble level as in claim 1, wherein each cam has a radial height, at least one cam has a different radial height than the remaining cams, and the guide groove associated with said at least one cam has a radial depth corresponding to said different radial height.

4. A bubble level as in claim 1, wherein said hollow section includes opposed elongated walls having outer surfaces and said level holder support means includes opposite front walls arranged flush with the outer surfaces of said opposed elongated walls.

5. A bubble level as in claim 1, further comprising cover means for sealing said plurality of guide grooves after said level holder support means is disposed within said level support means.

6. A bubble level as in claim 5, wherein said cover means includes at least two tabs for engaging the guide grooves.

7. A bubble level as in claim 6, wherein said hollow section includes an outer surface and said cover means further includes an outer surface adapted to lie flush in relation to the outer surface of said hollow section.

8. A bubble level as in claim 1, wherein said fastening means comprises ultrasonic welds.

9. A bubble level as in claim 1, wherein said plurality of cams are disposed on said level support means and said transverse guide grooves along with said ring groove are disposed in said level holder support means.

10. A bubble level as in claim 9, wherein said level holder support means has an outer circumferential surface complementing the cylindrical seat of said level support means and said guide grooves and ring groove are formed on said outer circumferential surface, further comprising a press seat in said level holder support means having means defining an opening at the outer circumferential surface of said level holder support means, and a level tube containing said level radially aligned with said press seat said level tube having a curved surface adjacent said opening, said level tube curved surface defining a cylindrical surface along said outer circumferential surface, and at least one cam of said cams contacts the curved surface of said level tube when said cams are rotated along said ring groove.

11. A bubble level as in claim 9, wherein said cams comprise projections projecting radially inwardly of said cylindrical seat.

12. A bubble level as in claim 1, wherein said cams are received in said guide grooves to preclude axial displacement of said level holder support means relative to said level support means.

13. A bubble level as in claim 1, wherein said plurality of cams are circumferentially spaced from one another, said plurality of guide grooves being circumferentially spaced from one another.

14. A bubble level as in claim 1, further comprising securing means securing said level support means to said hollow section.

* * * * *